Aug. 2, 1938.  B. F. WUPPER ET AL  2,125,706
PHONOGRAPH
Filed Oct. 25, 1935  7 Sheets-Sheet 2

Inventors:
Benjamin F. Wupper
James A. Davis
By Williams, Bradbury, McCaleb & Hinkle
Attys.

Aug. 2, 1938.   B. F. WUPPER ET AL   2,125,706
PHONOGRAPH
Filed Oct. 25, 1935   7 Sheets-Sheet 4

Inventors
Benjamin F. Wupper
James A. Davis
By Williams, Bradbury, McCaleb & Hinkle
Attys.

Aug. 2, 1938. B. F. WUPPER ET AL 2,125,706
PHONOGRAPH
Filed Oct. 25, 1935   7 Sheets-Sheet 6

Patented Aug. 2, 1938

2,125,706

UNITED STATES PATENT OFFICE 2,125,706

PHONOGRAPH

Benjamin F. Wupper, Park Ridge, and James A. Davis, Highland Park, Ill., assignors, by mesne assignments, to Rock-Ola Manufacturing Corporation, Chicago, Ill., a corporation of Delaware Application October 25, 1935, Serial No. 47,656

20 Claims. (Cl. 274—10)

This invention relates to phonographs, and has for a general object the provision of a novel and an improved phonograph of the multi-record type, by means of which the records may be played selectively one at a time in any desired sequence, or some or all of the records may be played in seriatim or a predetermined sequence.

Another object of the invention is the provision of a reliable and generally simplified record changer for the above mentioned type of phonograph.

A further object of the invention is to provide a plurality of record carrier operating members which are selectively operable, or a plurality or all of which are successively operable automatically to move the respective record carriers to their record delivery positions.

Other objects of the invention include the provision of the novel arrangements and combination of elements hereinafter disclosed and claimed, and as set forth in the accompanying drawings, wherein like reference characters relate to corresponding parts throughout the several views, and wherein:

Figures 1, 14:
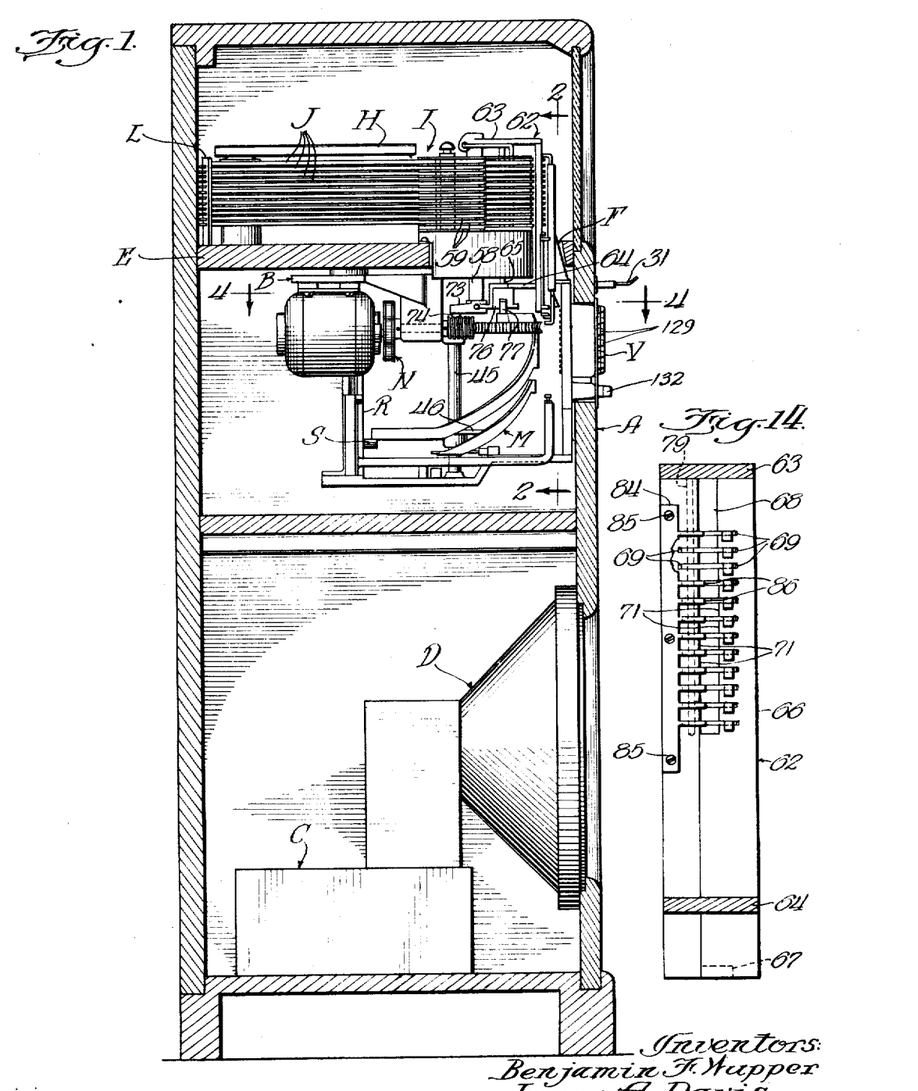
Fig. 1 is a vertical cross section of a phonograph embodying the features of the invention.
Fig. 14 is an elevational cross section taken substantially along the lines 14—14 of Fig. 11.

The illustrated phonograph comprises, as shown in Fig. 1, a casing or cabinet A of suitable construction for accommodating a chassis or frame B, amplifier means C, and speaker means D.

It will be understood that the chassis B is adapted to serve as mounting means for the record carrying and reproducing devices which, generally considered, cooperate to translate the irregularities or impulses recorded in the sound track of a record into mechanical vibrations and to convert those mechanical vibrations into electrical impulses. Those electrical impulses may then be supplied to the amplifier means C and, after amplification, they may be converted into sound by the speaker means D.

Figure 2:
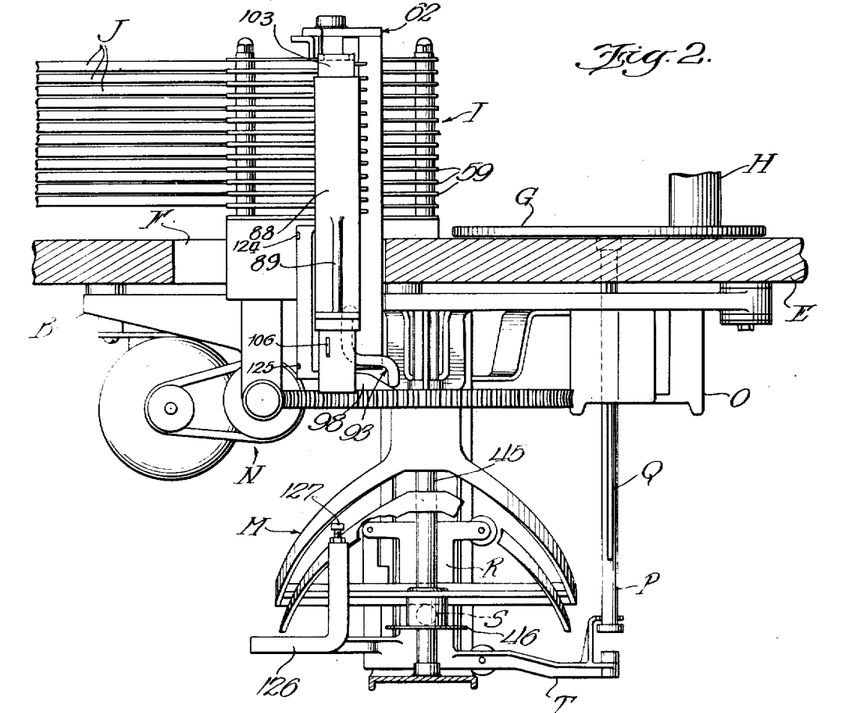
Fig. 2 is a fragmentary cross section taken substantially along the lines 2—2 of Fig. 1, but on a different scale.
Figure 5:
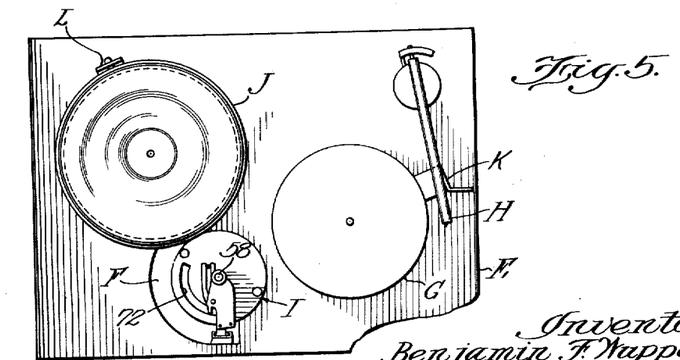
Fig. 5 is a plan view of the phonograph apparatus removed from the cabinet.
Figure 6:
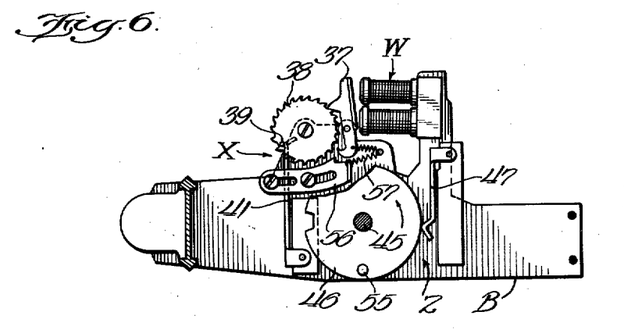
Fig. 6 is a detailed plan view of a part of the control apparatus of the illustrated phonograph.

As shown in Figs. 1, 2, and 5, the chassis B includes a mounting panel E, commonly referred to as a motor board, having an aperture F therein, and carries above the mounting panel a turntable G; record playing or reproducer means H; a record carrier supporting or mounting assembly I; a plurality of pivoted, ring-shaped record carriers or trays J arranged one above another in column or stack relationship and swingable to and from cooperative relationship with the turntable G; and members K and L providing individual supports for each record carrier J at the end thereof opposite the mounting assembly I when the record carrier is in its position of cooperation with the turntable and when it is in stack.

Below the mounting panel E, the chassis B, as will be seen by reference to Figs. 1, 2, 4, and 6, carries a master cam M; driving means N for driving the cam M; turntable rotating means O engaging a shaft P that carries at its upper end the turntable G and that is movable as indicated at Q (Fig. 2) toward and away from the reproducer means H; a reciprocable slide R having a cam follower S and a turntable reciprocating arm T; cam operable reproducer return means U for returning the reproducer means H to its starting position upon the completion of the playing of a record; selector control means V operable from outside the casing A; and various control devices which have been generally designated by the reference characters W, X, Y, and Z.

Figure 7:
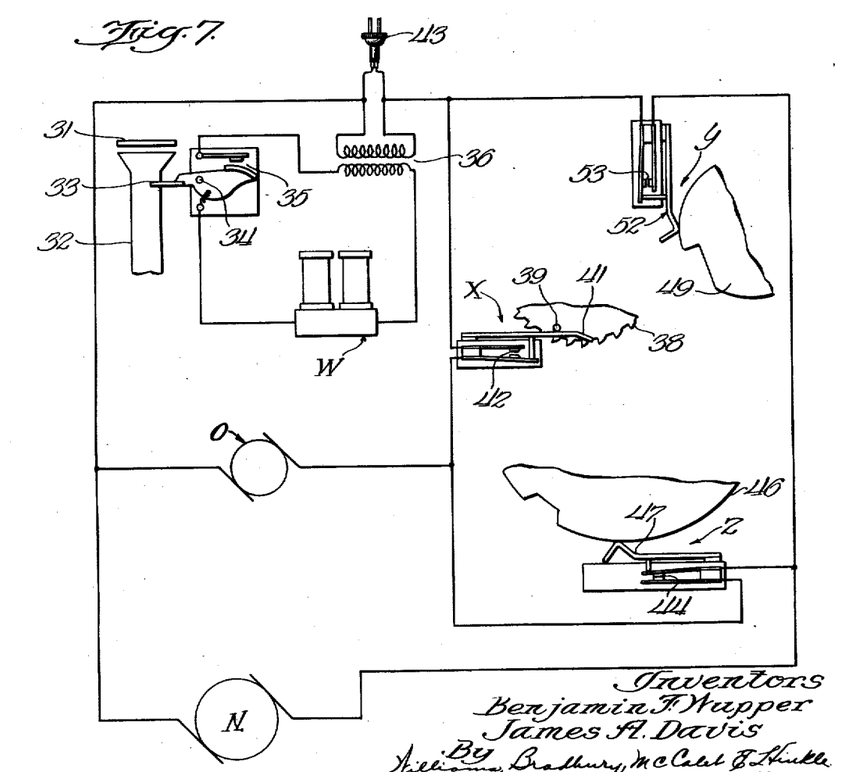
Fig. 7 is a schematic wiring diagram of the phonograph control apparatus.

Phonographs of the class to which this invention relates, are usually, but not necessarily, controlled by coin operated means which includes, as shown in Fig. 7, a slidable coin receiver 31 for delivering a coin to a coin slide or chute 32. In falling down the coin slide 32, the coin engages a switch arm 33 and swings it about its pivot 34 whereby to close switch contacts 35. When the contacts 35 are closed, a suitable source 36 of electrical energy will energize the control device W, which may be an electromagnet adapted to operate a pawl 37 for operating a ratchet 38 of the control device X. The ratchet 38 is provided with a pin or stud 39 which normally engages a switch operating arm 41 for holding switch contacts 42 open. When the ratchet 38 is operated by the pawl 37, the pin 39 releases the switch operating arm 41 permitting the contacts 42 to close. The turntable rotating means O is thereby connected in circuit with a suitable source of electrical energy, diagrammatically illustrated at 43, which energizes the turntable rotating means O to cause it to rotate the turntable G.

When the contacts 42 are thus closed by the operation of the control means W, they also connect the cam driving means N in circuit with the source 43 of energy through normally closed switch contacts 44 of the control device Z. The master cam M is thereby rotated, which causes the rotation of its shaft 45 on which the cam M is fixed and also the rotation of a notched disc 46 of the control device Z. The rotating master cam M by engaging the cam follower S raises the reciprocable slide R which carries with it the turntable reciprocating arm T, whereby to raise the rotating turntable G. If one of the record carriers J is in the position of cooperation with the turntable, the turntable during its last described movement passes through the carrier J and removes therefrom the record. The turntable continues its movement to bring the record into playing engagement with the record reproducer means H.

When the master cam M has rotated sufficiently to bring the turntable G into playing position, the cam shaft 45 has rotated the notched disc 46 until the notch therein registers with a switch operating arm 47 which permits the normally closed switch contacts 44 of the control device Z to open whereby to open the circuit including the cam driving means N. The cam M thereupon ceases to rotate and the reproducing means H plays the record on the turntable G.

In playing the record, the reproducer means H swings inwardly toward the center of the record being played on the turntable, thus rotating a shaft 48 connected with the reproducer means H and drivingly engageable with a notched disc 49 carried on the shaft 48. That notched disc 49 constitutes a part of the control device Y and has an operating projection 51 thereon which, during the rotation of the shaft 48 by the playing movement of the reproducer means H, swings toward the reproducer return means U.

When the playing of the record is completed by the reproducer means H, the shaft 48 has rotated the notched disc 49 of the control device Y until the projection 51 is adjacent the reproducer return means U and the notch in the disc 49 registers with a switch operating arm 52 controlling normally open switch contacts 53. Upon registration of the switch operating arm 52 with the notch in the disc 49 of the control device Y, the normally open switch contacts 53 close, thereby again connecting the cam driving means N in circuit with its energy supply source 43 and again causing it to rotate the master cam M and its shaft 45.

When the rotation of the master cam M is thus resumed, the cam follower S engaging in the cam track, and the slide R carrying the follower S are moved by the cam in a direction to cause the turntable reciprocating arm T to move the turntable G away from the reproducer means H and back through the positioned record carrier J whereby to deposit the played record thereon. Meanwhile, and after the played record has thus been moved out of playing engagement with the reproducer means H, a pin or stud 54 on the rotating master cam M engages the reproducer return means U and moves it to swing the disc 49 by engagement with its projection 51 in a direction to return the reproducer means to its starting position.

During the rotation of the disc 49, the notch in the disc passes beyond the switch operating arm 52 and the periphery of the disc cams the arm 52 in a direction to open the switch contacts 53. The opening of the switch contacts 53 does not, however, result in the stopping of the cam driving means N for the reason that before they have been opened, the rotation of the master cam M and its shaft 45 has caused the rotation of the notched disc 46 of the control device Z sufficiently to move the notch in that disc out of registration with the switch operating arm 47. During that rotation of the disc 46 the periphery of the disc has, before the opening of switch contacts 53, cammed the switch operating arm 47 in a direction to close the switch contacts 44 whereby the circuit including the energy source 43, the cam driving means N, the switch contacts 44, and the switch contacts 42 is reestablished.

The cam driving means N therefore continues driving the master cam M, its shaft 45, and the notched disc 46. When the rotating master cam M has completed its movement of the follower S the slide R, and the turntable reciprocating arm T in moving the turntable G away from the playing position, a pin or stud 55 (Fig. 6) on the notched disc 46 of the control device Z engages a reciprocable pawl 56 adjacent the ratchet 38 and moves the pawl 56 against the action of a spring 57. As soon as the notched disc 46 is rotated sufficiently for the pin 55 to disengage the reciprocable pawl 56, the spring 57 moves the pawl 56 in a direction to operate the ratchet 38 whereby the pin 39 on the ratchet engages the switch operating arm 41 and operates it to open the switch contacts 42. That opening of the switch contacts 42 interrupts not only the circuit including the cam driving means N but also that including the turntable rotating means O, whereupon the foregoing cycle may be repeated, if desired, by subsequent operations of the coin operated means.

As thus far described, the phonograph is substantially identical with that disclosed in United States patent application, Serial No. 22,701 of Paul H. Smyth, Jr., filed May 22, 1935. Such phonographs usually include some form of record changer by means of which the records in the record carriers J may be delivered one at a time to the turntable G each time it moves toward a playing position, and after playing returned to the stack by the respective record carriers. Each record carrier J remains in cooperative position with respect to the turntable G until that record is returned to the carrier, whereupon the carrier is swung back to stack position. Another record carrier may then be swung to cooperative position with respect to the turntable.

The record changer shown in the United States Patent No. 2,004,016 to Paul H. Smyth, Jr., includes a plurality of selectively operable clutch members associated with a plurality of pivoted record carriers similar to those shown at J in the accompanying drawings, each record carrier having an arm carrying one of the clutch members. An arm or yoke member swingable about the record carrier pivot is engageable by a clutch member when operated, whereby the arm of the record carrier is coupled to swing with the pivoted yoke member and to swing the record carrier to its position of cooperation with the turntable. That record changer includes a selector for selectively operating the clutch members. The selector comprises a plurality of selector fingers or members which are movable by selector control or operating means for selectively operating the clutch members to select a record.

In the Smyth application identified above, the record changer comprises an arm or yoke member swingable about a pivot or post 58 (Fig. 5) that carries the record carriers J, each of which is pivoted on the post 58 between successive discs 59 in the mounting assembly I and has an arm or a projection 61 at the side of the post 58 opposite the record carrier proper. A selector finger or member is slidable along the arm or yoke member for engaging a record carrier projection 61 and swings with the yoke member to swing the record carrier to a position over the turntable G. In that position of the record carrier, the selector member is automatically raised and held above the mounting assembly I out of engagement with the record carrier arm 61. Upon completion of the record, the selector finger in that raised position is swung to its initial position and the record carrier with the played record is returned to the stack. When the phonograph briefly described above and disclosed in the aforesaid Smyth application is next started, the raised selector finger is released, whereupon it gravitates from the raised position to a predetermined or selected position dependent upon the operation of the selector control V, where it will engage the arm 61 of the record carrier J at that position and swing that record carrier with the selected record over the turntable G.

In accordance with the present invention, the plurality of selector members as described in the above mentioned Smyth patent, are dispensed with and are replaced by a single selector member which, instead of engaging and swinging a selected record carrier to a position over the turntable, as described in the Smyth patent already identified above, operates a desired one of a plurality of oscillatable record carrier operating members, or a plurality of such oscillatable members in a desired sequence. Those oscillatable members, besides being oscillatable, are swingable about the pivot or post 58. Whenever they are swung about the post 58 in one direction, that oscillatable member operated by the selector member engages the arm 61 of the corresponding record carrier J and swings that arm 61 in a direction to move the record carrier to its position of cooperation with the turntable G.

Illustrative of the improved record changer of the present invention, we provide means for carrying the record carrier operating members adjacent the arms 61 of the respective record carriers J. The means just referred to may be a yoke 62 having upper and lower arms 63 and 64, respectively, a vertical member 65 extending between the arms 63 and 64 intermediate the ends thereof, and a connecting yoke member 66 extending from an end of the upper arm 63 to beyond the corresponding end of the lower arm 64 and having a lug 67 at its lower end, projecting from its side opposite the arms 63 and 64. The yoke member 66 has cut or otherwise formed therein a slot 68 extending longitudinally of the yoke member between the upper and lower arms 63 and 64. The material at opposite sides of the longitudinal slot 68 is provided with a plurality of aligned slots 69 communicating with the slot 68. The slots 69 are spaced apart longitudinally of the yoke member 66 the same distance as that existing between successive record carrier arms 61 in the mounting assembly I and provide a supporting lug 71 between successive slots.

That yoke 62 is adapted to be pivotally supported by the pivot post 58 with the upper and lower arms 63 and 64 pivotally engaging the post 58 above and below the mounting assembly I; with the vertical member 65 extending through aligned arcuate apertures 72 respectively provided in the discs 59; and with the vertical yoke member 66 extending alongside the mounting assembly I substantially parallel to the post 58 and through the aperture F in the mounting panel E.

Figure 4:
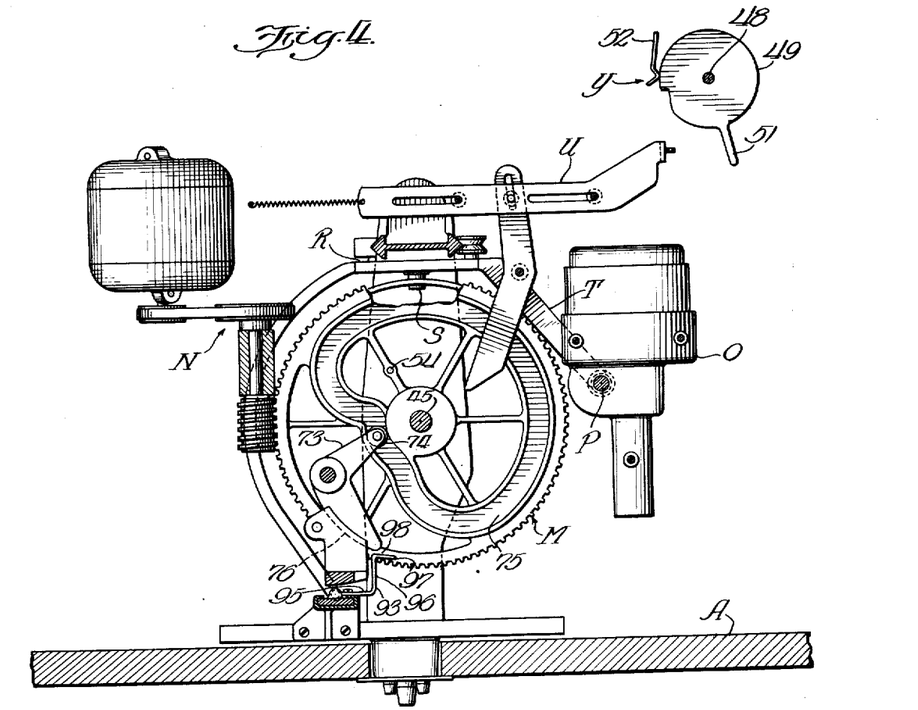
Fig. 4 is a fragmentary cross section taken substantially along the lines 4—4 of Fig. 1.

For swinging the yoke 62 about the post 58, the lower yoke arm 64 is provided with a crank arm 73 (see Figs. 1 and 4) carrying a cam follower 74 which is adapted to engage in a cam groove 75 on the master cam M, and the arm 64 between the post 58 and the vertical member 65 is provided with an offset portion 76 (see Fig. 1), which is engageable by a stud 77 on the master cam M for moving the yoke 62 when the cam groove 75 and the follower 74 reach a substantially dead center position as shown in Fig. 4.

When the yoke 62 is assembled on the post 58 as just described, the transverse slots 69 are respectively aligned with the spaces between each pair of the successive discs 59 in the mounting assembly I. Each slot 69 carries therein a record carrier dog or member 78 pivotally secured between successive supporting lugs 71 at one side of the longitudinal slot 68 in the yoke member 66 by a pivot pin or bolt 79 common to all of the dogs 78. Those dogs 78 are identical and each stamped or otherwise suitably formed to span across the longitudinal slot 68 and to extend into the aligned slot 69.

Each dog 78 is provided with an abutment 81 at its end opposite the pivot end, a projection or lug 82 at one side of the abutment 81 to facilitate moving the dog about its pivot, and at the opposite side of the abutment 81 a latching or limiting finger 83 engageable with a supporting lug 71 adjacent the slot 69 when the dog is resiliently held in its normal position by resilient means 84 preferably in the form of a comb-like spring secured as at 85 to the yoke member 66 and having teeth 86 respectively engaging the dogs 78. The comb spring 84 normally yieldably urges the dogs 78 about their pivot post 79 in a direction to cause the latching fingers 83 to engage the supporting lugs 71. By means of the lugs 82 any one of the dogs 78 may be swung about the pivot post 79 against the action of the resilient means 84 and into the space between successive discs 59 aligned with the thus operated dog.

If the operated dog is held in operated position until after the yoke 62 is swung in a record delivering direction, the latching finger 83 will engage behind or interlock with an arcuate flange 87 provided on the adjacent disc 59 at its periphery for latching the operated dog in that position. The swinging yoke 62 carrying the dogs 78 will thus bring the abutment 81 of the operated dog into engagement with the arm 61 of the record carrier J between the same discs 59 and will cause the record carrier to be swung to its position of cooperation with the turntable G. At that position of the record carrier, the yoke 62 moves the operated dog 78 until the latching finger thereon disengages the arcuate flange 87 whereupon the resilient means returns the dog to its normal position. We provide operable means cooperating with the reciprocable slide R and the selector control means V for operating one or more of the dogs 78. The operation of the dogs 78 by such means may be selective. The operable means may on the other hand operate all of the dogs in seriatim; or such operable means may operate any number of the dogs, successive or non-successive, one at a time.

Illustrative of such operable means, a substantially channel shaped guide member 88 is provided at one side thereof with a mounting bracket 89 for supporting attachment as at 91 to the chassis B and opposite the free ends of the record carrier arms 61 when the record carriers are in stack. The opposite side of the guide member 88 has secured thereto as at 92 a pawl 93 which has a depending portion 94, a laterally extending portion 95 adjacent the depending portion and extending beyond the vertical yoke member 66 in its record carrier return position, an offset portion 96 extending inwardly from the laterally extending portion to a position above the master cam M, and an operating portion 97 operable by a cam lug 98 on the master cam M.

That pawl 93 has a pawl tooth 99 on the depending portion 94 and is normally urged by a spring 101 in a direction to urge the pawl tooth 99 toward engagement with a rack 102 of a slide or reciprocable member 103 slidably carried in the guide member 88 and adapted to be held in a raised position by the engagement of the pawl tooth 99 and the rack 102.

Figures 8, 9, 10:
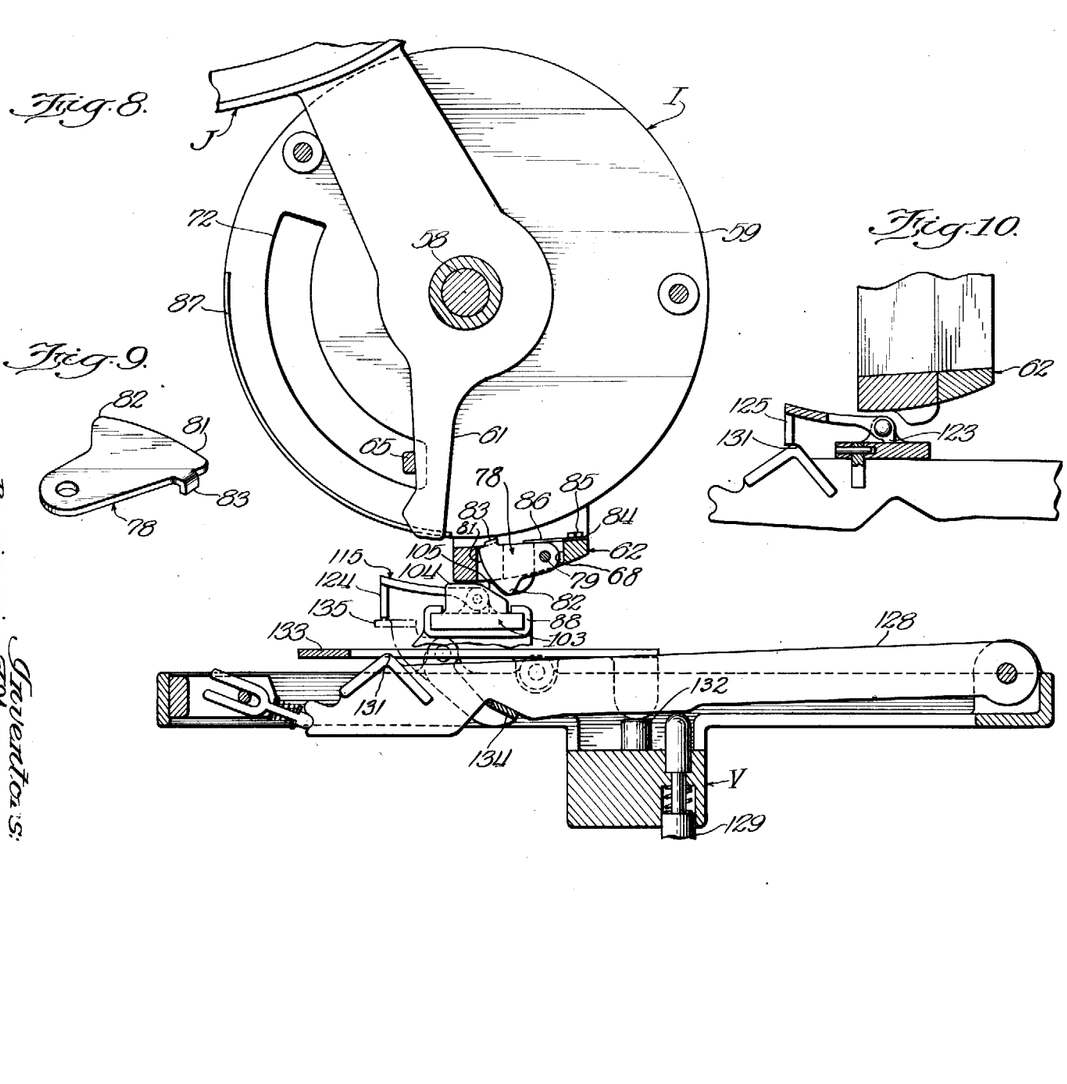
Fig. 8 is a fragmentary plan section of the novel record changer associated with suitable control means therefor.
Fig. 9 is a perspective view of a record changer element for engaging a desired record carrier in changing a record.
Fig. 10 is a fragmentary section similar to Fig. 8, and showing automatic means for resetting the selector control after each selection.

As illustrated, that slide member 103 has at its upper end a selector finger or member 104 which is reciprocable with the slide member along a course outwardly adjacent the vertical yoke member 66 in the position shown in Fig. 8, and which is provided with an inclined or beveled edge portion 105 for cooperating with the lugs 82 in the operation of the dogs 78. At the lower end of the slide member, we provide novel means adapted to cooperate with the selector control V for limiting the movement of the selector finger 104 in one direction and for permitting its movement in the opposite direction.

Such means in suitable form is shown as comprising a stop member 106 pivoted as at 107 in a slot 108 provided in the slide member 103 and having a portion 109 projecting forwardly outside of the slot 108. That forwardly projecting portion 109 is preferably provided with an abutment or limiting surface 111 and an adjacent inclined surface 112. During the downward movement of the selector finger 104 the abutment surface 111 cooperates with the selector control V to limit the position of the selector finger 104, and during the upward movement of the selector finger 104, the inclined surface 112 permits the member 106 to be swung about its pivot 107 against the action of a spring 113. The pivoted member 106 is provided with a lug or projection 114 engageable with the slide member 103 at a side of the slot 108 for limiting the forward movement of the pivoted member 106.

The slide member 103 carries a yoke like member 115 operable by the lug 67 on the vertical yoke member 66 and pivotally secured at its upper end by, for example, a bolt 116 to a lug 117 intermediate the ends of the slide member 103, and at its lower end, by a bolt 118 to a lug 119 near the lower end of the slide member 103. If desired, the bolt 118 may extend between the lug 119 and a lug 121 at the lower end of the slide member 103 and may carry a spring 122 for yieldably holding the yoke like member 115 with its limiting lug 123 (Fig. 10) engaging the slide member 103 at the pivot lug 119. Projecting forwardly from the vertical arm of the yoke like member 115 are an upper lug 124 and a lower lug 125. The upper lug 124 is adapted to operate the selector control V automatically to select a plurality of records, and the lower lug 125 functionally is a selector control reset member.

Figures 11, 12, 13:
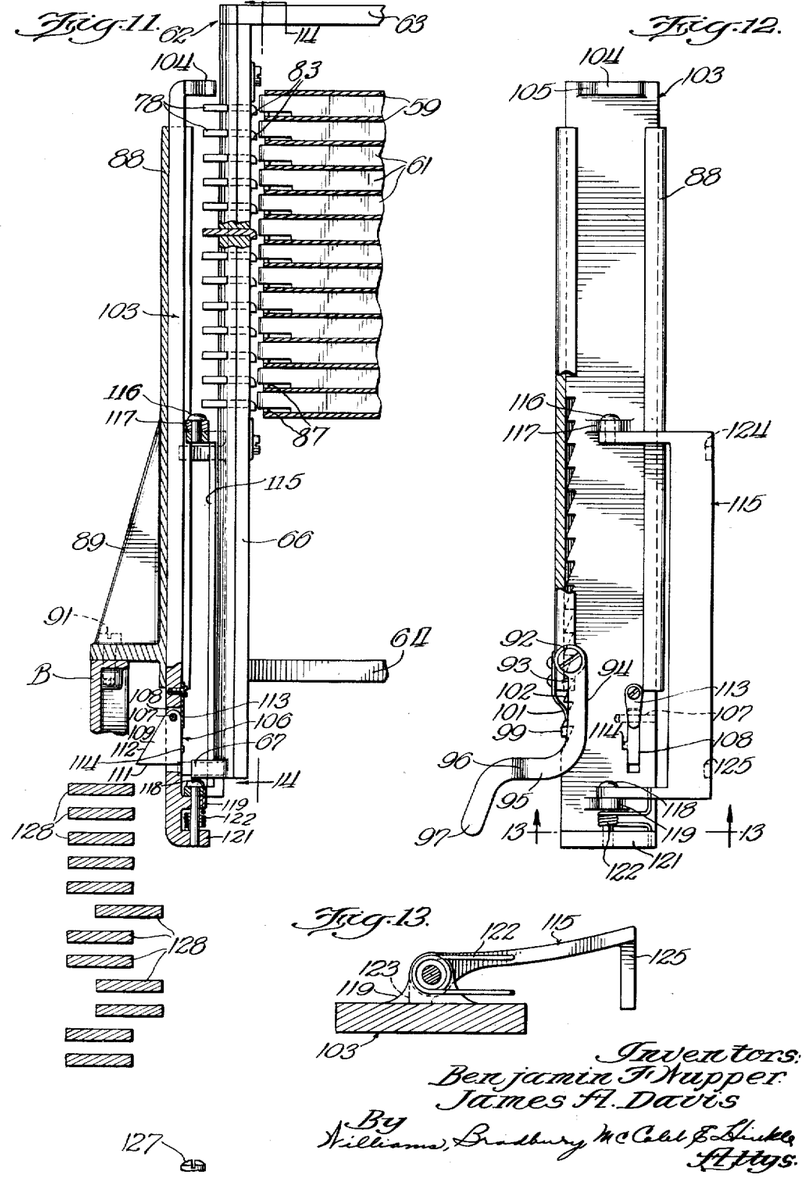
Fig. 11 is a fragmentary vertical cross section of the record changer shown in Fig. 8, with parts broken away to bring out certain structural details.
Fig. 12 is a rear elevation of the selector employed in the record changer of the preceding figure.
Fig. 13 is a sectional detail taken substantially along the lines 13—13 of Fig. 12.

For operating the slide member 103 whereby to operate the selector finger 104, the reciprocable slide R is provided with an arm 126 extending from the side thereof opposite the turntable reciprocating arm T around the master cam M to a position beneath the lug 121 on the slide member 103 and at that end is provided with an adjustable member 127 for engaging the lug 121 to raise the slide member and hence the selector finger 104 to a position such that the selector finger as shown in Fig. 11 is at a greater elevation than the uppermost dog 78. The selector control V cooperates with the pivoted member 106 to determine and control the descent of the slide member 103 and the selector finger 104 carried thereby.

Figure 3:
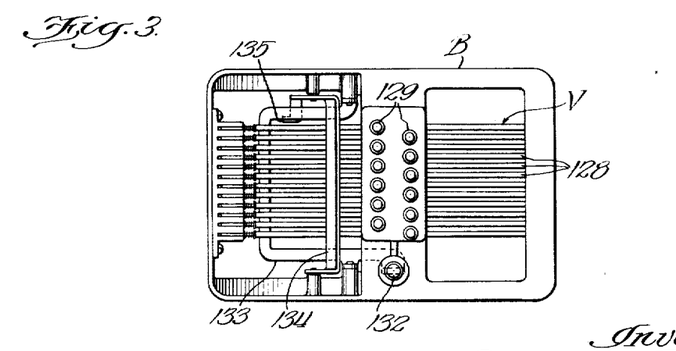
Fig. 3 is an elevational view of a selector control unit suitable for use in connection with the invention.

As illustrated, the selector control V is substantially identical with that shown in the above mentioned Smyth application and, briefly, comprises a plurality of horizontally swingable bars 128 corresponding in number to the number of record carriers J and independently operable to their respective selecting positions by a plurality of push buttons 129. The bars are automatically, and, respectively, returnable to their non-selecting positions by the reset lug 125 engaging a reset surface 131 on the respective bars when the lug 67 swings the yoke like member 115 forwardly about its pivoting screws 116 and 118. The selector control V also includes a cancellation button 132 for operating a pivoted yoke 133 and returning any and all of the bars 128 from selecting to non-selecting positions. In addition, a multi-selecting yoke 134 is pivotally carried in the selector control. As shown in Fig. 3 this yoke 134 is adapted to move all of the bars 128 to their selecting position, but whether all or some of the bars are operable by the yoke 134, it is essentially an automatic operating means for the selector control and for that purpose is provided with an operating lug or projection 135 which is engageable by the upper lug 124 when the slide member 103 is in its lowermost position so that when the vertical yoke member 66 swings in a record carrier delivering direction, the lug 67 will operate the yoke like member 115 and cause the lug 124 thereon to swing the operating projection 135 in a direction to cause the multi-selecting yoke 134 to operate a plurality of the bars 128 to their selecting positions.

The operation of the phonograph equipped with the novel record changer is diagrammatically illustrated in Figs. 15 to 22. In the normal non-playing position, the record carriers J are in stack, the turntable G is down; the reproducer H is in the starting position shown in Fig. 5; the slide member 103 is in its uppermost position with the selector finger 104 at a greater elevation than the uppermost dog 78; and the cam lug 98, is as shown in Fig. 2, adjacent the operating portion 97 of the pawl 93.

Before or after one or more coins are inserted in the coin operated control apparatus 31, 32 to start the phonograph as already described, one or more buttons 129, depending upon whether one or more coins are inserted, are operated to move one or more of the bars 128 to their respective selecting positions. When the control apparatus 31, 32 is operated, driving means N is energized to cause the rotation of the master cam M carrying the cam lug 98.

Figures 15, 16, 17, 18, 19, 20, 21, 22:
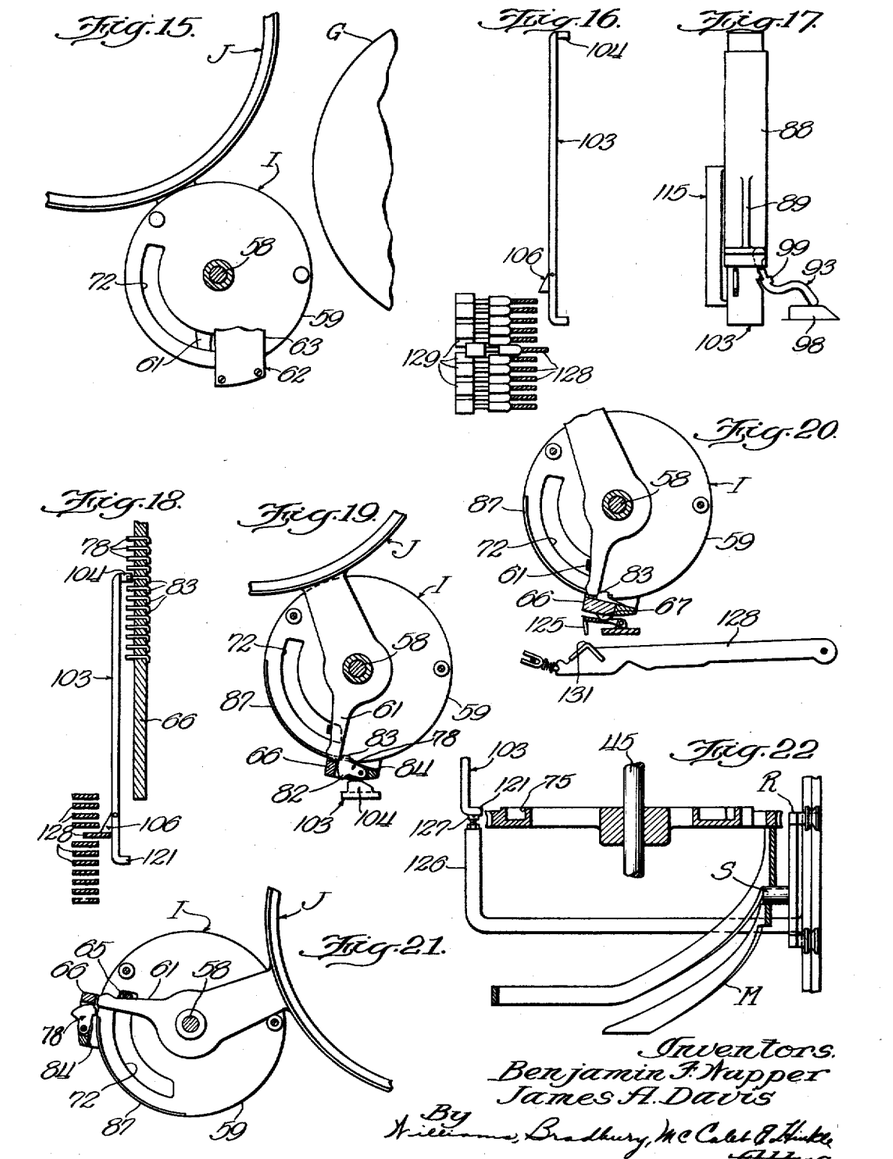
Figs. 15 to 22, inclusive, are fragmentary diagrammatic views illustrative of the operation of the novel record changer.

As shown in Fig. 17, the cam lug 98 on the master cam M operates the pawl 93 to release the slide member 103 which gravitates from the position shown in Fig. 16 until the stop member 106 engages the uppermost bar 128 swung to the selecting position by the operation of one or more of the buttons 129. The engagement between the stop member 106 and the selector bar 128 brings the slide member to rest, as shown in Fig. 18. In that position, the selector finger 104 at the upper end of the slide member 103 is in the path of the dog 78 corresponding to the seselector bar 128 engaged by the stop member 106.

The dogs 78, it will be remembered, are swingable with the yoke member 66 which is operable from the cam groove 75 (Fig. 4) and the cam follower 74 through the crank arm 73 and the yoke arm 64 between the positions shown in Figs. 15 and 21 in swinging the record carriers J to and from a position over the turntable G. In swinging toward the position shown in Fig. 21, the projection 82 on the dog 78 corresponding to the selected record carrier J engages the selector finger 104 and is cammed about its pivot 79 inwardly between successive discs 59. That dog 78 is held between those discs 59 during further swinging movement by its engagement with the selector finger 104 until the latching finger engages behind the flange 87 as illustrated in Fig. 19, thus preventing the dog 78 from being returned to its normal position by the spring 84 while the dog is engaging and moving the projection 61 on the selected record carrier whereby to move the record carrier to its position over the turntable.

As the yoke member 66 carrying the operated dog 78 continues its movement toward the position shown in Fig. 21, the abutment 81 of the dog engages the projection 61 of the record carrier J between the successive discs 59 and drives it in a record delivering direction (Fig. 19). The yoke member 66 thus swinging brings the lug 67 carried thereby into engagement with the yoke like member 115 which has gravitated with the slide member 103 until the selector control reset lug 125 on the yoke like member is aligned with the reset surface 131 of the bar 128 engaged by the stop member 106. The lug 67 swinging with the yoke member 66 operates the yoke like member 115 to cause the reset lug 125 to move the bar 128 from its selecting position to its non-selecting position as illustrated in Fig. 20. The pawl 93 engaging the rack 102 holds the slide member 103 in the selected position after the bar 128 has been returned to its non-selecting position as just described. When the selected record carrier J driven by the operated dog 78 reaches its position over the turntable or its delivery position (Fig. 21) the latching finger 83 disengages the arcuate flange 87 and the spring 84 returns the dog to its normal position as shown in Fig. 21.

The master cam M now actuates the cam follower S to raise the reciprocable slide R which carries with it the turntable raising arm T and the arm 12, whereby to raise the rotating turntable G through the selected record carrier J, and to raise the slide member 103 to the position shown in Fig. 16 respectively. The turntable thus, as already described, is operated to present the record in the selected carrier for playing by the reproducer means H. The apparatus is now in the position illustrated in Fig. 22.

When, upon completion of playing of the record, the master cam M actuates the cam follower S and through the slide R to lower the turntable, the slide member elevating mechanism including the arm 126 is lowered. The pawl 93 engaging the rack 102 holds the slide member 103 in the elevated position after the arm 126 is lowered. When the turntable is moved away from the reproducer means H, the reproducer return means U, as already described, returns the reproducer means H to its starting position, and the turntable deposits the played record on the record carrier from which it was originally removed, and which has remained in the delivery position during the playing of the selected record.

When the played record is deposited on the record carrier, the cam groove 75 actuates the cam follower 74 to operate the crank arm 73 whereby to swing the yoke 62 and the yoke member 65 from the position shown in Fig. 21 toward the position shown in Fig. 15. In thus swinging, the yoke member 65 engages the projection 61 of the record carrier bearing the played record and swings it in a direction to return the record carrier to the stack.

When the cam lug 98 next operates the pawl 93 to release the slide member 103, the foregoing cycle will be repeated, the stop member 106, as before, engaging the uppermost selector bar 128 in the selecting position, which may be the same selector bar 128 that was automatically returned to the non-selecting position as described above if it was meanwhile returned to the selecting position as described above by the appropriate button 129, or which may be below or above the last mentioned bar 128. If, while a lower bar 128 is coacting with the stop member 106 or before the slide member 103 is elevated to the position shown in Figs. 11 and 16, any bar or bars 128 above the mentioned lower bar are operated to a selecting position or positions, the spring 113 will permit the stop member 106 to swing about its pivot 107 as its inclined surface 112 is engaged by each such bar 128 whereby not to interfere with the raising of the slide member 103.

If none of the bars 128 is moved to its selecting position, or if the cancellation button 132 has been operated before the raised slide member 103 is released, the slide member will gravitate until the multi-selector lug 124 on the yoke like member 115 carried by the slide member registers with the operating projection 135 of the multi-selecting yoke 134 so that when the lug 67 on the swinging yoke 62 next engages the yoke like member 115, it will cause the operation of the multi-selecting yoke 134 to move a plurality of the bars 128 to their selecting positions. Any suitable means, for example, the reciprocating, adjustable member 127, may be employed to stop the slide member 103 when the lug 124 registers with the projection 135 as just described.

While the invention has been described in connection with the Smyth phonograph, it is not limited to any particular phonograph, but, as will be readily understood by those skilled in the art, the invention may be embodied in various phonographs and is susceptible to divers modifications and changes within the scope of the claims to follow.

Having thus described our invention, what we claim as new, and desire to secure by Letters Patent of the United States, is:

1. A phonograph comprising swingable record reproducing means, a turntable movable to and from said reproducing means, a plurality of record carriers movable into and from the path of said turntable, swingable means including a plurality of record carrier operating members for respectively engaging said record carriers and moving them into the path of said turntable, and a reciprocable selector engageable by said swingable means for selectively operating said record carrier operating members to cause any one of them to engage the corresponding record carrier and to move it into the path of said turntable.

2. A phonograph comprising reproducer means, a turntable movable to and from said reproducer means, a plurality of record carriers each having an arm at one side thereof, said arms being pivoted intermediate their ends on a common pivot whereby said record carriers are swingable into and from the path of said turntable, a plurality of record carrier operating members each adjacent the outer end of a said arm and engageable with a said arm, said members being swingable about said common pivot, and a reciprocable selector means for selectively operating said record carrier operating members to cause any one of them to engage the corresponding record carrier and to move it into the path of said turntable.

3. In a phonograph with means for playing records, a record changer comprising a plurality of record carriers, means individual to each said record carrier for moving the record carriers in a record delivering direction, and reciprocable selector means engageable by the last said means for selectively operating the last said means into record carrier engaging relation to select the record carriers operated thereby.

4. In a phonograph with means for playing records, a stack of pivoted record carriers, a plurality of members swingable about the record carrier pivot, each being oscillatable to and from a position at which it, when swung about the record carrier pivot, will engage a said record carrier and swing it in a record delivering direction, and reciprocable means movable to and from the path of any said member about the record carrier pivot for operating the last said member to its position for swinging the corresponding record carrier in a record delivering direction.

5. In a phonograph with means for playing records, a plurality of record carriers having a common pivot about which they are individually swingable to and from cooperative relationship with the record playing means, a plurality of record carrier operating members for respectively engaging said record carriers, each said member being swingable about said common pivot, and each having a pivot about which it is oscillatable to and from driving engagement with the corresponding record carrier, means for operating one of said members about its last said pivot to driving engagement with the corresponding record carrier, and means for swinging the operated member about said common pivot to swing the corresponding record carrier to cooperative relationship with said record playing means.

6. A phonograph comprising reproducer means, a turntable movable to and from playing relationship with said reproducer means, a record carrier pivoted to swing between a position laterally of the path of said turntable and a position in the path of said turntable for delivering a record to be played to and receiving the played record from the turntable, rigid means for supporting said record carrier outwardly of its pivot to reinforce the record carrier against sagging, a record carrier operating member spaced from the record carrier pivot and swingable thereabout, said member being movable to and from a position for engaging said record carrier when said member swings in a direction to swing said record carrier in the path of said turntable, means for moving said member to said position, and cooperating means on said rigid means and said member for holding the latter in said position while said member is swinging said record carrier into the path of said turntable.

7. A phonograph comprising reproducer means, a turntable movable to and from playing relationship with said reproducer means, a record carrier pivoted to swing between a position laterally of the path of said turntable and a position in the path of said turntable for delivering a record to be played to and receiving the played record from the turntable, rigid means for supporting said record carrier outwardly of its pivot to reinforce the record carrier against sagging, a record carrier operating member spaced from the record carrier pivot and swingable thereabout, said member being movable to and from a position for engaging said record carrier, means for moving said member to said position, cooperating means on said rigid means and said member for holding the latter in said position while said member is swinging said record carrier into the path of said turntable, and means for automatically moving said member from said member from said position when said record carrier is swung into the path of said turntable.

8. In a phonograph, a plurality of superposed, laterally swingable record carriers, a turntable, means pivoted to swing horizontally for swinging the record carriers to a position above the turntable and including a plurality of oscillatable members respectively adjacent said record carriers for engaging the respective record carriers, means adjustable to a plurality of elevations for engaging any of said oscillatable members, and means for moving the first said means about its pivot whereby the oscillatable member engaged by the adjustable means in an adjusted position will move a said record carrier to a position above said turntable.

9. In a phonograph, a plurality of record carriers, a turntable, selectable means individual to each said record carrier and movable to and from engagement therewith and swingable horizontally for moving it to a position above the turntable, selector means for moving said selectable means to engagement with the respective record carriers, selector control means for simultaneously selecting a plurality of said selectable means, said selector control means being arranged for governing said selector means whereby the plurality of selectable means selected by said selector control means are moved one at a time to engagement with their respectively corresponding record carriers, means for moving said turntable to pick up the record on any said record carrier in its position over the turntable, means for rotating said turntable, and means for actuating the foregoing means.

10. In a phonograph, a plurality of superposed record carriers pivoted on a common axis to swing horizontally, a turntable, operable means pivoted alongside of said record carriers and having a combined oscillatory movement about its pivot and lateral swinging movement about another pivot for engaging a said record carrier, means adjustable to a plurality of elevations for operating said operable means during its lateral swinging movement to cause said operable means to engage a predetermined record carrier, and automatically operable means for swinging said operable means to move the predetermined record carrier to a position above the turntable.

11. In a phonograph, a plurality of record carriers pivoted on a common axis to swing horizontally, a turntable, operable means for engaging each said record carrier, said operable means having a pivot alongside of said record carriers about which it is oscillatable and another pivot about which it is laterally swingable, automatically operable means for swinging said operable means to move a said record carrier engaged thereby to a position above the turntable, and means adjustable alongside of said record carriers for selectively operating said operable means about its first said pivot to cause said operable means to engage a predetermined record carrier.

12. In a phonograph, a plurality of record carriers pivoted on a common axis to swing horizontally, a turntable, operable means for engaging each said record carrier, said operable means having a pivot alongside of said record carriers about which it is oscillatable and another pivot about which it is laterally swingable, automatically operable means for swinging said operable means to move a said record carrier engaged thereby to a position above the turntable, means adjustable alongside of said record carriers for selectively operating said operable means about its first said pivot to cause said operable means to engage a predetermined record carrier, and means for adjusting the adjustable means to cause said operable means to engage a plurality of said record carriers successively.

13. In a phonograph, a plurality of record carriers pivoted on a common axis to swing horizontally, a turntable, operable means for engaging each said record carrier, said operable means having a pivot alongside of said record carriers about which it is oscillatable and another pivot about which it is laterally swingable, automatically operable means for swinging said operable means to move a said record carrier engaged thereby to a position above the turntable, means adjustable alongside of said record carriers for operating said operable means about its first said pivot to cause said operable means to engage said record carriers, and means for adjusting the adjustable means to cause said operable means to engage a plurality of said record carriers successively.

14. In a phonograph, the combination with a turntable and a plurality of swingable record carriers cooperating therewith for changing records, of selector means for selecting a record to be played, record carrier operating means having a pivot alongside said record carriers and capable of bodily swinging movement, means for imparting bodily swinging movement to said record carrier operating means, and reciprocable means controlled by said selector means for operating said record carrier operating means about said pivot to cause it to engage and, in swinging bodily, to swing the record carrier bearing said record selected by said selector means into cooperative relation with respect to said turntable.

15. In a phonograph, the combination with a turntable and a plurality of swingable record carriers cooperating therewith for changing records, of selector means for selecting a plurality of records to be played, record carrier operating means oscillatable to and from engagement with any said record carrier and bodily swingable for operating the same, means for imparting bodily swinging movements to said record carrier operating means, and reciprocable means controlled by said selector means for operating said record carrier operating means successively to engage and, in bodily swinging, to swing the record carriers bearing the plurality of records selected by said selector means into cooperative relation with respect to said turntable.

16. In combination in a phonograph for playing records, a stack of independently operable record carriers for supporting the respective records before and after playing, bodily swingable record carrier operating means including a plurality of independently oscillatable members each being adapted when moved in one direction to engage a said record carrier, means common to said oscillatable members for selectively moving the same one at a time in the direction to engage the respective record carriers, and means for bodily swinging said record carrier operating means to operate the engaged record carriers.

17. In combination in a phonograph for playing records, a stack of independently operable record carriers for carrying records to and from the stack in the changing from a played record to a record to be played, bodily swingable record carrier operating means including a plurality of members each independently movable in one direction to a driving position with respect to a said record carrier, means common to all of said members for moving them one at a time in any sequence to their respective driving positions, and means for bodily swinging said record carrier operating means to operate said record carriers when the respective movable members are moved to their driving positions.

18. In combination in a phonograph for playing records one at a time, a stack of independently operable record carriers for carrying records to and from the stack in the changing from a played record to a record to be played, selector means adjustable along the stack of record carriers to a predetermined position with respect to each said record carrier, bodily swingable record carrier operating means including a plurality of movable members arranged in positions respectively corresponding to the positions of said selector means, each said movable member being engageable by said selector means in its position corresponding to the position of the said movable member for moving said movable member to driving engagement with the corresponding record carrier by the bodily swinging of the record carrier operating means, means for successively adjusting said selector means to a plurality of said predetermined positions, and means for bodily swinging said record carrier operating means while said selector means is in each said position.

19. In combination in a phonograph for playing records one at a time, a stack of independently operable record carriers for carrying records to and from the stack in the changing from a played record to a record to be played, selector means adjustable along the stack of record carriers to a predetermined position with respect to each said record carrier, bodily swingable record carrier operating means including a plurality of movable members arranged in positions respectively corresponding to the positions of said selector means, each said movable member being engageable by said selector means in its position corresponding to the position of the said movable member for moving said movable member to driving engagement with the corresponding record carrier by the bodily swinging of the record carrier operating means, means for adjusting said selector means to a said predetermined position, and means for bodily swinging said record carrier operating means while said selector means is in said position.

20. In a phonograph with means for playing records, a record changer comprising a plurality of record carriers, a reciprocable member adjustable to a plurality of positions respectively corresponding to said record carriers, and movable record carrier moving means individual to each said record carrier for moving the record carriers in a record delivering direction, said means being movable to and from driving engagement with the corresponding record carrier by said reciprocable member when said reciprocable member is in its position corresponding to the record carrier operated by said means.

BENJAMIN F. WUPPER.
JAMES A. DAVIS.

CERTIFICATE OF CORRECTION.

Patent No. 2,125,706.   August 2, 1938.

BENJAMIN F. WUPPER, ET AL.

It is hereby certified that error appears in the printed specification of the above numbered patent requiring correction as follows: Page 5, second column, line 65, for the syllable "mem-" read member; page 6, second column, lines 49 and 50, claim 7, strike out the words "from said member"; and that the said Letters Patent should be read with this correction therein that the same may conform to the record of the case in the Patent Office.

Signed and sealed this 13th day of September, A. D. 1938.

Henry Van Arsdale (Seal)   Acting Commissioner of Patents.

predetermined positions, and means for bodily swinging said record carrier operating means while said selector means is in each said position.

19. In combination in a phonograph for playing records one at a time, a stack of independently operable record carriers for carrying records to and from the stack in the changing from a played record to a record to be played, selector means adjustable along the stack of record carriers to a predetermined position with respect to each said record carrier, bodily swingable record carrier operating means including a plurality of movable members arranged in positions respectively corresponding to the positions of said selector means, each said movable member being engageable by said selector means in its position corresponding to the position of the said movable member for moving said movable member to driving engagement with the corresponding record carrier by the bodily swinging of the record carrier operating means, means for adjusting said selector means to a said predetermined position, and means for bodily swinging said record carrier operating means while said selector means is in said position.

20. In a phonograph with means for playing records, a record changer comprising a plurality of record carriers, a reciprocable member adjustable to a plurality of positions respectively corresponding to said record carriers, and movable record carrier moving means individual to each said record carrier for moving the record carriers in a record delivering direction, said means being movable to and from driving engagement with the corresponding record carrier by said reciprocable member when said reciprocable member is in its position corresponding to the record carrier operated by said means.

BENJAMIN F. WUPPER.
JAMES A. DAVIS.

CERTIFICATE OF CORRECTION.

Patent No. 2,125,706. August 2, 1938.

BENJAMIN F. WUPPER, ET AL.

It is hereby certified that error appears in the printed specification of the above numbered patent requiring correction as follows: Page 5, second column, line 65, for the syllable "mem-" read member; page 6, second column, lines 49 and 50, claim 7, strike out the words "from said member"; and that the said Letters Patent should be read with this correction therein that the same may conform to the record of the case in the Patent Office.

Signed and sealed this 13th day of September, A. D. 1938.

Henry Van Arsdale (Seal) Acting Commissioner of Patents.